(12) United States Patent
Kim

(10) Patent No.: US 12,398,651 B2
(45) Date of Patent: Aug. 26, 2025

(54) SEAL ASSEMBLY AND A TURBINE WITH THE SAME

(71) Applicant: DOOSAN ENERBILITY CO., LTD., Changwon (KR)

(72) Inventor: Eojin Kim, Suwon (KR)

(73) Assignee: DOOSAN ENERBILTY CO., LTD., Changwon (KR)

( * ) Notice: Subject to any disclaimer, the term of this patent is extended or adjusted under 35 U.S.C. 154(b) by 0 days.

(21) Appl. No.: 18/396,822

(22) Filed: Dec. 27, 2023

(65) Prior Publication Data

US 2024/0309771 A1 Sep. 19, 2024

(30) Foreign Application Priority Data

Mar. 16, 2023 (KR) ........................ 10-2023-0034661

(51) Int. Cl.
| | | |
|---|---|---|
| *F01D 11/00* | (2006.01) | |
| *F01D 11/02* | (2006.01) | |
| *F16J 15/02* | (2006.01) | |
| *F16J 15/10* | (2006.01) | |

(Continued)

(52) U.S. Cl.
CPC .......... *F01D 11/005* (2013.01); *F01D 11/008* (2013.01); *F01D 11/025* (2013.01);
(Continued)

(58) Field of Classification Search
CPC .... F01D 11/025; F01D 11/008; F01D 11/005; F05D 2240/55; F05D 2240/59; F05D 2240/80; F05D 2240/11; F05D 2240/81; F16J 15/02; F16J 15/08; F16J 15/441; F16J 15/4476; F16J 15/021; F16J 15/022; F16J 15/10; F16J 15/104; F16J 15/106
(Continued)

(56) References Cited

U.S. PATENT DOCUMENTS

| | | | |
|---|---|---|---|
| 5,997,247 A | 12/1999 | Arraitz | |
| 6,733,234 B2 * | 5/2004 | Paprotna | .............. F16J 15/0812 277/637 |

(Continued)

FOREIGN PATENT DOCUMENTS

| | | |
|---|---|---|
| JP | 2008-31870 A | 2/2008 |
| KR | 10-2005-0042197 A | 5/2005 |

(Continued)

OTHER PUBLICATIONS

English machine translation of KR-10-2017-0008396-A, Jun. 14, 2024.*

(Continued)

*Primary Examiner* — Christopher Verdier
(74) *Attorney, Agent, or Firm* — Harvest IP Law, LLP

(57) ABSTRACT

Disclosed is a seal assembly and a turbine including the same. The seal assembly includes: a first seal portion including a plurality of seal bodies stacked to be spaced apart from each other; and a second seal portion including a plurality of seal bodies stacked to be spaced apart from each other, and ends of the seal bodies of the first seal portion are inserted between the seal bodies of the second seal portion and each of the seal bodies is stacked alternately to form a stacked unit, and the seal bodies adjacent to each other are spaced apart from each other if an external force does not exist.

20 Claims, 13 Drawing Sheets

(51) Int. Cl.
*F16J 15/44* (2006.01)
*F16J 15/447* (2006.01)

(52) U.S. Cl.
CPC ............. *F16J 15/02* (2013.01); *F16J 15/104* (2013.01); *F16J 15/441* (2013.01); *F16J 15/4476* (2013.01); *F05D 2240/55* (2013.01); *F05D 2240/59* (2013.01); *F05D 2240/80* (2013.01)

(58) Field of Classification Search
USPC ........................................ 415/135, 138, 139
See application file for complete search history.

(56) References Cited

U.S. PATENT DOCUMENTS

| | | | |
|---|---|---|---|
| 2010/0074731 A1 | 3/2010 | Wiebe | |
| 2012/0189435 A1* | 7/2012 | Morgan | ................ F01D 11/005 415/174.2 |
| 2017/0106482 A1 | 4/2017 | Roberts | |
| 2017/0284214 A1* | 10/2017 | Albert | ................... F16J 15/442 |

FOREIGN PATENT DOCUMENTS

| | | | |
|---|---|---|---|
| KR | 10-2017-0008396 A | * | 1/2017 |
| SU | 1200609 A1 | | 1/1984 |
| WO | WO-2008/145546 A1 | * | 12/2008 |

OTHER PUBLICATIONS

English machine translation of WO-2008/145546-A1, Jun. 14, 2024.*
English machine translation of JP2008-031870A, Jun. 14, 2024.*
Extended European Search Report for EP 24155228, Mar. 6, 2024.*
KR Office Action dated Feb. 20, 2025.

* cited by examiner

SEAL ASSEMBLY AND A TURBINE WITH THE SAME

CROSS REFERENCE TO RELATED APPLICATION

The present application claims priority to Korea Patent Application No. 10-2023-0034661, filed Mar. 16, 2023, the entire contents of which is incorporated herein for all purposes by this reference.

FIELD

The present disclosure relates to a seal assembly and a turbine having the seal assembly, more particularly, a seal assembly for sealing between parts included in the turbine.

BACKGROUND

A turbine is a mechanical device that obtains a rotational force by an impulsive force or reaction force using a flow of a compressible fluid such as steam or gas. The turbine includes a steam turbine using a steam and a gas turbine using a high temperature combustion gas.

The gas turbine includes a compressor, a combustor, and a turbine. The compressor includes an air inlet into which air is introduced, and a plurality of compressor vanes and compressor blades which are alternately arranged in a compressor casing. The air introduced from outside is gradually compressed through the rotary compressor blades disposed in multiple stages up to a target pressure.

The combustor supplies fuel to the compressed air compressed in the compressor and ignites a fuel-air mixture with a burner to produce a high temperature and high pressure combustion gas.

The turbine includes a plurality of turbine vanes and turbine blades disposed alternately in a turbine casing. Further, a rotor is arranged passing through center of the compressor, the combustor, the turbine and an exhaust chamber.

The rotor is rotatably supported at both ends thereof by bearings. A plurality of disks are fixed to the rotor and the plurality of blades are coupled to corresponding disks, respectively. A driving shaft of a generator is connected to an end of the rotor that is adjacent to the exhaust chamber.

The gas turbine does not have a reciprocating mechanism such as a piston which is usually provided in a four-stroke engine. That is, the gas turbine has no mutual frictional parts such as a piston-cylinder mechanism, thereby having advantages in that consumption of lubricant is extremely small, an amplitude of vibration, which is a characteristic of a reciprocating machine, is greatly reduced, and high speed operation is possible.

Briefly describing the operation of the gas turbine, the compressed air compressed by the compressor is mixed with fuel and combusted to produce a high-temperature combustion gas, which is then injected toward the turbine. The injected combustion gas passes through the turbine vanes and the turbine blades to generate a rotational force by which the rotor is rotated.

Here, to efficiently convert the energy of the injected combustion gas into kinetic energy of the turbine blade while minimizing a loss, it is essential to minimize any leak in the flow path. To this end, various kinds of seals are used.

For example, a vane carrier for supporting a turbine vane are disposed with a plurality of vane carriers divided on a circumference, and seals are provided to prevent a leak between the vane carriers. However, in the flow path, a gap between adjacent parts are continuously changed due to thermal expansion and vibration caused by a high temperature combustion gas. Consequently, maintaining the initial performance of leak prevention becomes challenging.

SUMMARY

The present disclosure is devised to overcome the above-mentioned problem of the prior art, and aims to provide a seal assembly capable of absorbing a relative movement between parts to maintain a desired leakage prevention performance.

One embodiment is a seal assembly, including: a first seal portion including a plurality of seal bodies stacked to be spaced apart from each other; and a second seal portion including a plurality of seal bodies stacked to be spaced apart from each other, and ends of the seal bodies of the first seal portion may be inserted between the seal bodies of the second seal portion such that each of the seal bodies of the first seal portion and each of the seal bodies of the second seal portion are stacked alternately and at least partially overlap each other to form an over lapping portion.

That is, according to the present disclosure, a seal assembly in which two seal portions having roughly a shape of a hair comb inserted into each other to overlap is provided. The seal bodies of the first seal portion and the second seal portion are alternately disposed, that is, each of which are disposed one after another. That is, the seal body of the second seal portion is interposed between the seal bodies of the first seal portion. In this case, it is configured that the seal bodies are to be spaced apart from each other, and the spaced seal bodies come into contact with each other to prevent a leak when a pressure due to a leaked gas is applied. In addition, the spaced-apart seal bodies provide a gap at which one seal portion can move, thereby letting changes to a shape or a position of a sealed part caused by thermal expansion and the like be absorbed.

Each of the first seal portion and the second seal portion may have a bonding portion configured to fix the plurality of seal bodies on one end thereof, and the overlapping portion may be disposed between the bonding portion of the first seal portion and the bonding portion of the second seal portion.

Each of the first seal portion and the second seal portion may include a spacer provided between the seal bodies to form a spacing between the seal bodies. The spacer may be integrated into the seal body or may be formed separately from the spacer.

The spacer may be a part of the bonding portion. That is, the seal bodies and the spacers may be integrally formed together.

The bonding portion may be formed by welding, and may be positioned on lateral surfaces of the first seal portion and the second seal portion.

When a first part and a second part adjoin each other in a turbine, at least a part of the first seal portion may be inserted into the first part, and at least a part of the second seal portion may be inserted into the second part, and at least a part of the overlapping portion may be disposed to cover a gap between the first and second parts.

The seal bodies may be made of a flexible material compared with a material of the spacer, or made of the same material as that of the spacer.

In addition, the seal bodies may have the same thickness, or at least one among the seal bodies may have a different thickness from a thickness of another of the seal bodies.

A top seal body disposed at an uppermost end in the first seal portion and a bottom seal body disposed at a lowermost end in the second seal portion may have a greatest thickness. Alternatively, one seal body having the greatest thickness may be disposed between a top seal body and a bottom seal body.

In addition, thicknesses of the seal bodies of the first seal portion and the second seal portion may gradually decrease toward each other.

Another embodiment is a turbine, including: at least two parts disposed adjacent to each other; seal accommodating grooves formed, respectively, on surfaces of the at least two parts opposing each other; and a seal assembly including a first seal portion and a second seal portion inserted into the seal accommodating grooves, respectively, and the first seal portion and the second seal portion may include a plurality of seal bodies stacked to be spaced apart from each other, and ends of the seal bodies of the first seal portion may be inserted between the seal bodies of the second seal portion such that each of the seal bodies of the first seal portion and each of the seal bodies of the second seal portion are stacked alternately and at least partially overlap each other to form an overlapping portion.

The two parts may be a turbine vane segment including two platforms, being spaced apart from each other in a radial direction of the turbine, and a turbine vane extending between the platforms, and each of the seal accommodating grooves may be formed on a surface of the platforms opposing each other. In addition, the seal assembly may be applied to any position configured to seal a gap between two parts.

Still another embodiment is a seal assembly, including: a first seal portion including a plurality of seal bodies stacked to be spaced apart from each other; and a second seal portion including a plurality of seal bodies stacked to be spaced apart from each other, and ends of the seal bodies of the first seal portion may be inserted between the seal bodies of the second seal portion along a first direction and each of the seal bodies may be stacked alternately and at least partially overlap each other to form an overlapping portion, and both ends of the seal body disposed at an uppermost side of the first seal portion may have combined portions bent outward along the first direction.

In this case, additional seals may be disposed at each of the combined portions and may be applied to seal a T-shaped joint.

In this case, different pressures may be applied to both sides of the additional seals, and the combined portion may be disposed in a region having a relatively higher pressure.

According to one aspect of the present disclosure having the above-mentioned configuration, it is possible to maintain a sealing performance by smoothly absorbing a relative movement when corresponding parts are thermally deformed or moved and the relative position is changed since two seal portions are spaced apart from each other.

In addition, according to an embodiment, since a plurality of seal bodies and spacers are bonded through one welding process, it is advantageous that the manufacturing process is made easy.

In addition, it is possible to adjust a performance of the seal assembly depending on circumstances by freely setting thicknesses of the plurality of seal bodies.

DETAILED DESCRIPTION

Figure 1:
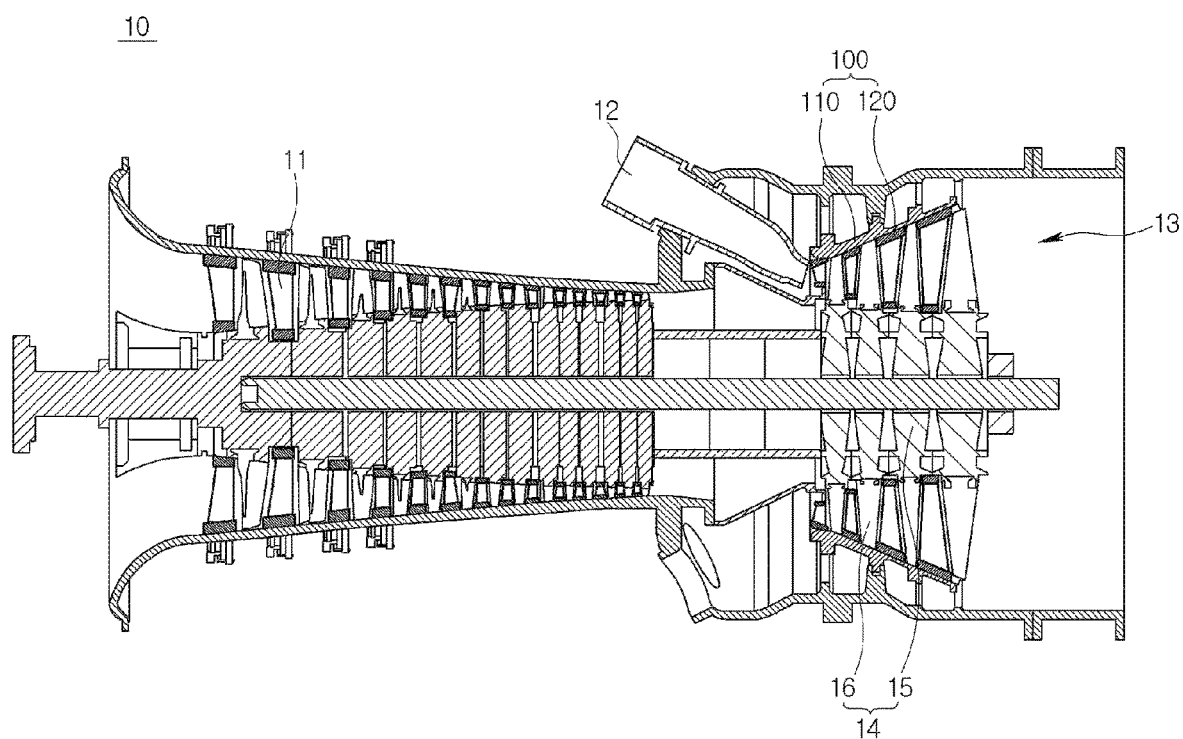
FIG. 1 is a cross-sectional view that schematically illustrates an internal structure of a gas turbine.

Although the present disclosure has been described with reference to the embodiments illustrated in the drawings, this is merely exemplary and should be understood as not being restrictive. It will be understood by those skilled in the art that various modifications and equivalent embodiments thereto may be implemented. Accordingly, the scope of the present disclosure should be determined by the following claims. It is also to be interpreted that the meaning and scope of the claims and all the changes or modified forms derived from the equivalents thereof come within the scope of the present disclosure.

Hereinafter, the seal assembly according to the present disclosure and a turbine including the same will be described with reference to the accompanying drawings. Like reference numerals are used to describe like components. In this specification, a turbine according to the present disclosure will be described on an assumption that the turbine is a gas turbine, but the gas turbine is merely an example, and it is apparent that the turbine according to the present disclosure may be a steam turbine, instead of the gas turbine.

Referring to FIG. 1, the gas turbine 10 according to the present disclosure includes a compressor 11, a combustor 12, and a turbine 13. Based on a flow direction of a gas (compressed air or a combustion gas), the compressor 11 is disposed at an upstream side of the gas turbine 10, and the turbine 13 is disposed at a downstream side of the gas turbine 10. In addition, the combustor 12 is disposed between the compressor 11 and the turbine 13.

The compressor 11 accommodates a compressor vane and a compressor rotor in the compressor casing, and the turbine 13 accommodates a turbine vane segment 120 and a turbine rotor 14 in a turbine casing 110. The compressor vane and the compressor rotor are disposed in a multi-stage structure along the flow direction of compressed air. The turbine vane segment 120 and the turbine rotor 14 are also disposed in a multi-stage structure along the flow direction of combustion gas. Here, the compressor 11 is designed such that an internal space thereof is gradually decreased from a front stage to a rear stage so that air taken into the compressor 11 can be compressed. In contrast, the turbine 13 is designed such that an internal space thereof is gradually increased from a front stage to a rear stage so that combustion gas supplied from the combustor 12 can be expanded.

Meanwhile, a torque tube functioning as a torque transmission member for transmitting rotational torque generated from the turbine 13 to the compressor 11 is disposed between the compressor rotor that is positioned at the rearmost stage of the compressor 11 and the turbine rotor 14 that is positioned at the foremost stage of the turbine 13. As illustrated in FIG. 1, the torque tube may be configured of a plurality of torque tube disks arranged in a three-stage structure, but this is only one of various embodiments of the present disclosure. Further, the torque tube may be configured of a plurality of torque tube disks arranged in four or more stages or in two or fewer stages.

Each compressor rotor includes a compressor disk and compressor blades. In the compressor casing, a plurality (e.g., fourteen) of compressor disks are provided, and each of the compressor disks is coupled by a tie rod such that the compressor disks are not spaced apart from each other in an axial direction of the gas turbine. In more detail, with the tie rod passing through each central portion of the compressor disks, each of the compressor disks is arranged along the axial direction. In addition, the compressor disks adjacent to each other are disposed such that facing surfaces of adjacent compressor disks are pressed by the tie rod so that the adjacent compressor disks cannot rotate relative to each other.

A plurality of compressor blades is radially coupled to an outer circumferential surface of each of the compressor disks. In addition, a plurality of compressor vanes is disposed between the compressor blades, wherein the plurality of compressor vanes is mounted on an inner circumferential surface of the compressor casing and formed in an annular shape on the basis of respective stages. Unlike the compressor disks, the plurality of compressor vanes are configured to be stationary and do not rotate. Further, the compressor vanes is configured to align a flow of compressed air passed through the compressor blades positioned at the upstream side and to guide the compressed air to the compressor blades positioned at the downstream side. Here, the compressor casing and the compressor vanes are collectively referred to as a compressor stator in order to distinguish the compressor casing and the compressor vanes from the compressor rotors.

The tie rod is disposed to pass through central portions of the plurality of compressor disks and turbine disks that will be described later. Further, one end of the tie rod is fastened to an inner portion of the compressor disk that is positioned at the foremost side of the compressor, and the other end of the tie rod is fastened by a fixing nut.

A shape of the tie rod is not limited to the shape illustrated in FIG. 1, and the tie rod may be formed in various shapes depending on the needs in a gas turbine. That is, one shape in which a tie rod is passing through the central portions of the compressor disks and the turbine disks, another shape in which a plurality of tie rods is arranged in a circumferential direction, or a combination of the above two shapes may be used.

Although not illustrated, a deswirler functioning as a guide vane may be mounted in the compressor of the gas turbine so as to adjust a flow angle of fluid to a designed flow angle, and thereby increases a pressure of the fluid entering an inlet of the combustor.

The combustor 12 where the compressed air is mixed with fuel ignites the fuel mixture to generate high-temperature and high-pressure combustion gas having high energy, and increases, through an isobaric combustion, the temperature of the combustion gas to a heat-resistant temperature limit at which parts of the combustor 12 and parts of the turbine 13 can endure.

The combustor configuring a combustion system of the gas turbine 10 may include a plurality of combustors arranged in a combustor casing formed in a cell shape. Each of the combustors includes a nozzle for ejecting fuel, a liner forming a combustion chamber, and a transition piece serving as a connection portion between the combustor and the turbine.

In detail, the liner provides a combustion space in which fuel ejected from the nozzle is mixed with compressed air supplied from the compressor 11 and then combusted. In the liner, the combustion chamber providing the combustion space in which the fuel mixed with air is combusted and a liner annular channel forming an annular space surrounding the combustion chamber are formed. In addition, the nozzle for ejecting fuel is coupled to a front end of the liner, and an igniter is coupled to a side wall of the liner.

Compressed air introduced through a plurality of holes formed in an outer wall of the liner flows in the liner annular channel. Further, compressed air used to cool the transition piece that will be described below also flows through liner channel. As such, since compressed air flows along the outer wall of the liner, the liner may be prevented from being damaged by heat generated by combustion of fuel in the combustion chamber.

The transition piece is connected to a rear end of the liner so as to transfer combustion gas combusted by an ignition plug toward the turbine. In the same manner as the liner, the transition piece includes a transition piece annular channel surrounding an internal space of the transition piece. Further, an outer wall of the transition piece is cool ed by compressed air flowing along the transition piece annular channel so that the transition piece may be prevented from being damaged by high-temperature combustion gas.

Meanwhile, high-temperature and high-pressure combustion gas discharged from the combustor 12 is supplied into the turbine 13. The high-temperature and high-pressure combustion gas supplied into the turbine 13 expands while passing through an inner portion of the turbine 13, thereby applying impulsive and reaction force to turbine blades to generate a rotational torque. The rotational torque is transmitted to the compressor via the torque tube. Additional rotational torque in excess of the torque required to drive the compressor is used to drive a generator or the like.

The turbine 13 basically has a structure similar to that of the compressor 11. That is, the turbine 13 includes the plurality of turbine rotors 14 which are similar to the compressor rotor of the compressor 11. Therefore, each turbine rotor 14 also includes a turbine disk 15, and a plurality of turbine blades 16 radially disposed on the turbine disk. The plurality of turbine vane segments 120 are provided between the turbine blades 16, wherein the plurality of turbine vanes 120 is mounted on the turbine casing 110 in an annular shape on the basis of respective stages. Further, the turbine vane segment 120 guides the flow direction of combustion gas passing through the turbine blades 16. Here, the turbine casing 110 and the turbine vane segment 120 are collectively referred to as a turbine stator 100 in order to distinguish the turbine casing 110 and the turbine vane segment 120 from the turbine rotors 14.

Hereinafter, for convenience of description, a reference mark 'C' is a circumferential direction of the turbine casing 110, and a reference mark 'R' is a radial direction of the turbine casing 110. A reference mark 'A' is the axial direction of the gas turbine 10. Throughout the specification, a radially inner side and a radially outer side may be referred to as a lower side and an upper side.

Figure 2:
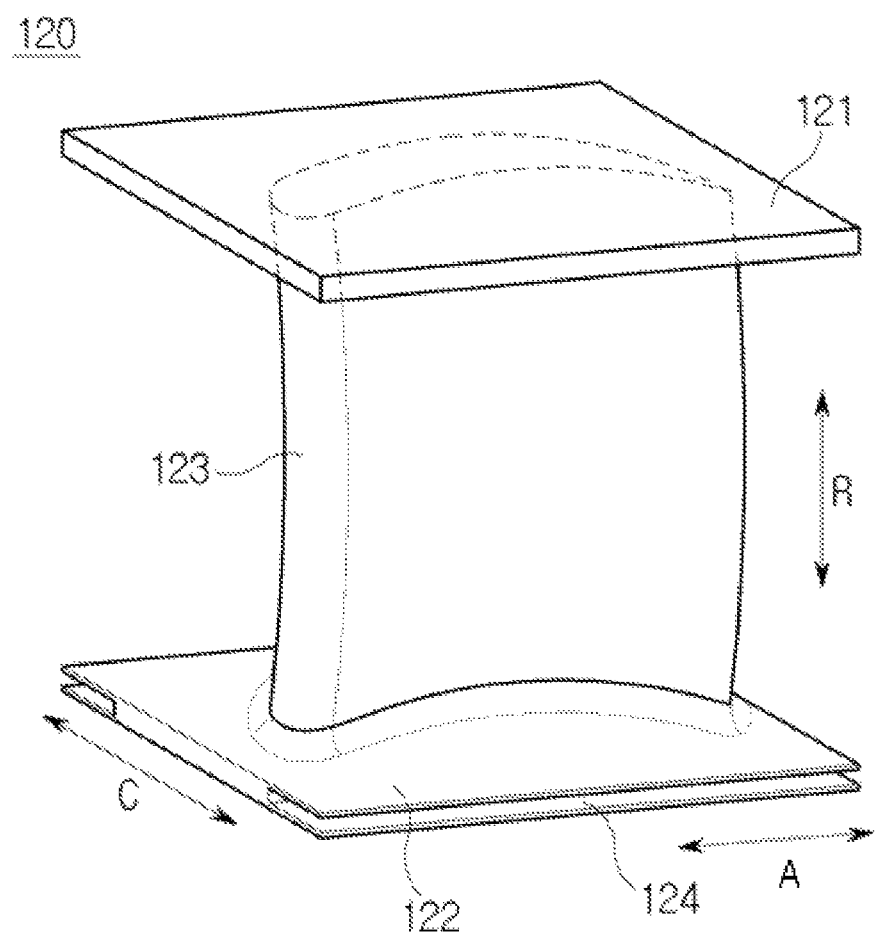
FIG. 2 is a perspective view that illustrates a part of a gas turbine to which a seal assembly according to the present disclosure can be applied.

Referring to FIG. 2, the turbine vane segment 120 includes two platforms 121 and 122 (i.e., outer platform 121 and inner platform 122) radially spaced apart from each other. The platforms roughly have an arc shape, but is not limited thereto, and may have any shape that can be adopted by the conventional gas turbine. A turbine vane 123 is disposed between the two platforms and configured to guide a flow of a combustion gas to the blade side.

A space between the two platforms 121, 122 provides a path in which the combustion gas flows. As described above, the plurality of turbine vane segments are disposed in an annular shape, and a gap exists between neighboring vane segments, especially between neighboring platforms. Since the gap provides a potential leakage path of the combustion gas flowing along a flow path, it necessitates the use of a sealing means to prevent such leak.

The inner platform 122 has four side surfaces. Two side surfaces of the inner platform 122 are facing, in the axial direction A, an upstream side and a downstream side of the gas turbine 110, respectively. These two side surfaces may be referred to as axially facing side surfaces. The other two side surfaces of the inner platform 122 are facing, in the circumferential direction C, inner platforms of two adjacent vane segments. These two side surfaces may be referred to as circumferentially facing side surfaces.

Seal accommodating grooves are formed on the circumferentially facing side surfaces of the inner platform 122. That is, a seal accommodating groove is formed to extend along and on one side surface facing a neighboring inner platform among four side surfaces of the inner platform 122. Another seal accommodating groove is formed along and on the other side surface facing a neighboring inner platform located at the circumferentially opposite side. The seal accommodating grooves may be extended along the axial direction A. In the illustrated example, the seal accommodating groove is depicted as formed only in the platform disposed at a lower side. However, according to embodiments, the seal accommodating groove may be formed at both upper and lower side platforms (i.e., outer platform and inner platform) or only at the upper side platform (i.e., outer platform).

Figure 3:
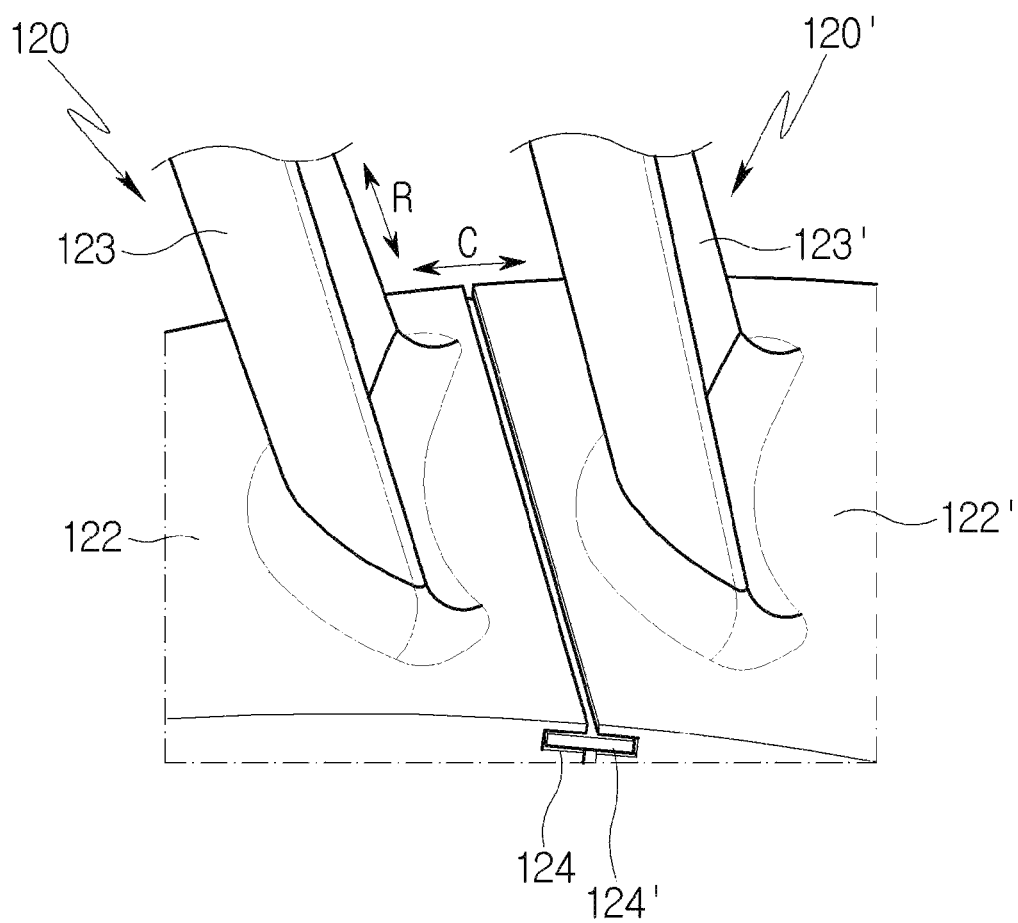
FIG. 3 is a perspective view that illustrates a state in which a first embodiment of a seal assembly according to the present disclosure is installed between two adjacent parts.

Referring to FIG. 3, the embodiment of the seal assembly according to the present disclosure which is inserted into two neighboring seal accommodating grooves 124 and 124' is illustrated. The two seal accommodating grooves are formed on side surfaces on which inner platforms 122 and 122' of two neighboring turbine vane segments 120 and 120' face each other. The two turbine vane segments include the turbine vanes 123 and 123', respectively.

A relative position of one segment 120' with respect to the other segment 120 may change by a high temperature combustion gas or vibration during the operation of the turbine. Therefore, the seal assembly inserted into the two seal accommodating grooves experiences change in the relative position of the vane segments 120, 120'. As a results, a sealing performance of a conventional integral type seal may deteriorate according to this change. Therefore, a measure to address the deterioration is necessary.

Figure 4:
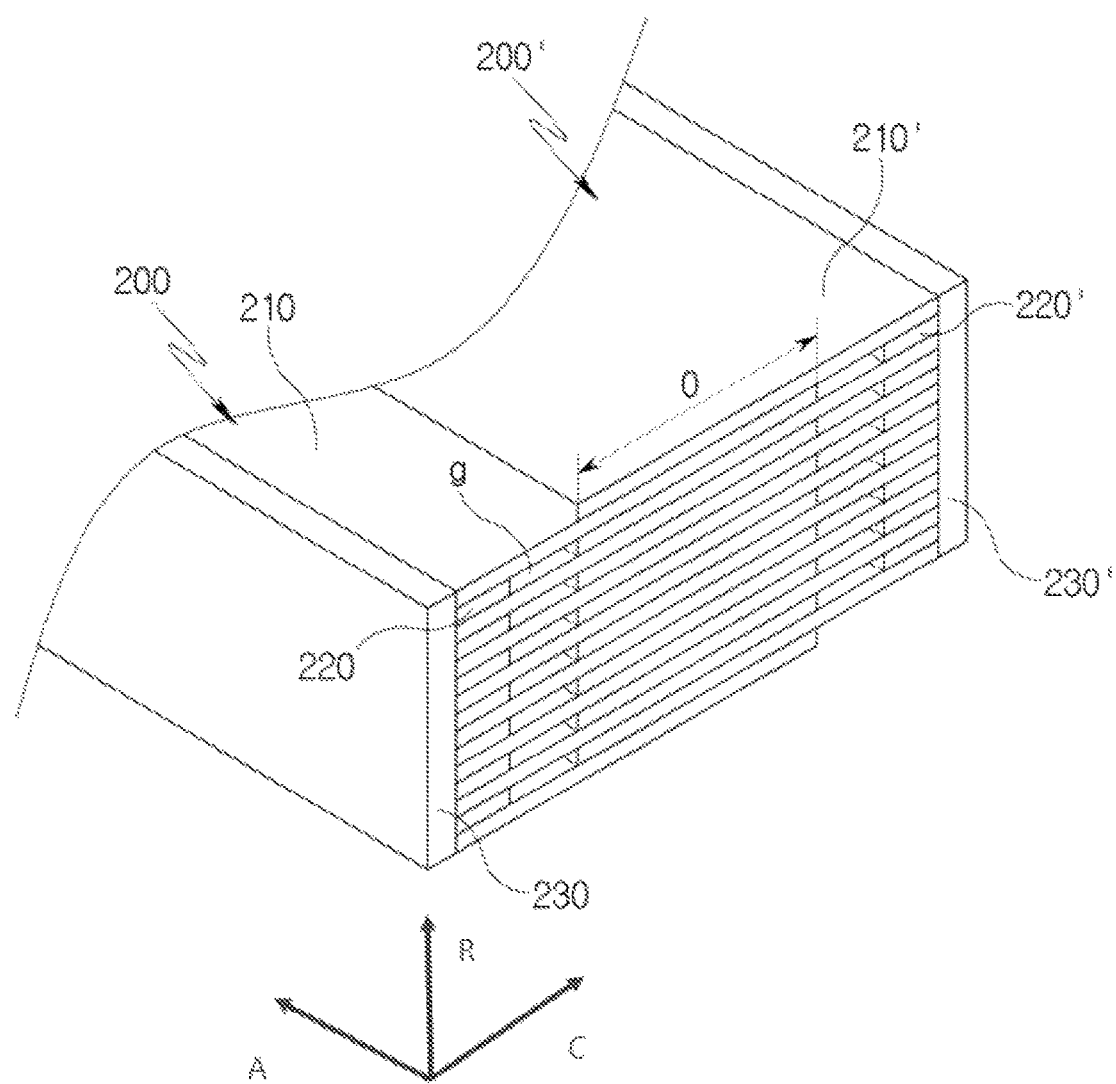
FIG. 4 is a perspective view that illustrates the first embodiment.

In FIG. 4, a first embodiment of the seal assembly according to the present disclosure is illustrated. The first embodiment includes a first seal portion 200 and a second seal portion 200', which are formed to be identical. Each of the seal portions has roughly a shape of a hair comb. In more detail, the seal portions 200, 200' include rectangular thin sheet-shaped first seal bodies 210 and second seal bodies 210', respectively. The first seal bodies 210 are stacked in the radial direction R having a space (i.e., a gap g) between each other. Correspondingly, the second seal bodies 210' are also stacked in the radial direction R having a space (i.e., a gap g) between each other. The seal portions 200, 200' have further include a first spacer 220 and a second spacer 220'. The first spacer 220 and the second spacer 220' may be disposed between the seal bodies 210 and 210', respectively, to maintain the gap g in the radial direction R between the seal bodies 210 and between the seal bodies 210'.

A thickness of the spacers in the radial direction R, in other words, the gap g between adjacent seal bodies, may be formed to be greater than a thickness of each of the seal bodies. In addition, a width of the spacers is a lot smaller than a width of the seal bodies when the widths are measured in the circumferential direction. Therefore, spaces are formed between adjacent seal bodies in the first seal portion, and the seal bodies of the second seal portion may be inserted into such spaces of the seal bodies of the first seal portion. As such, one seal assembly is formed such that ends of the second seal bodies 210' of the second seal portion 200' are inserted between the first seal bodies 210 of the first seal portion and ends of the first seal bodies 210 of the first seal portion 200 are inserted between the second seal bodes 210'. Parts referred to as 230 and 230' are bonding portions which are formed by welding the plurality of seal bodies 210 and spacers 220 to one another and/or by welding the plurality of seal bodies 210' and the spacers 220' to one another, respectively.

The seal assembly has bonding portions 230 and 230' disposed at both ends thereof in the circumferential direction R, respectively, and an overlapping portion O is formed between the two bonding portions 230 and 230', where the seal bodies 230 and the seal bodies 230' are inserted into each other.

In some cases, it is possible to consider an example of forming the bonding portion 230 by welding the plurality of seal bodies 210 without the spacers in a state in which the seal bodies are spaced apart from each other in the radial direction R. In such embodiment, in the seal assembly, it may be understood as that the seal bodies 210 are disposed on the bonding portion 230 such that the seal bodies 210 protrude in the circumferential direction C from the bonding portion 230 toward the bonding portion 230'. In addition, it is possible to consider an example of forming the bonding portion 230 such that the bonding portion 230 is not disposed at the outermost side, but disposed on a surface on which the spacers and seal bodies contact each other, thereby making the bonding portion 230 to be invisible from the outside. According to an embodiment, the bonding portion 230 may be any kinds of bonding means which bond the spacers 220 and the seal bodies 210. For example, the bonding portion 230 may be an adhesive disposed between the spacers 220 and the seal bodies 210. The description below is based on one case among the above various possible embodiments for convenience of description, however, it is apparent that all examples are applicable.

Figure 5:
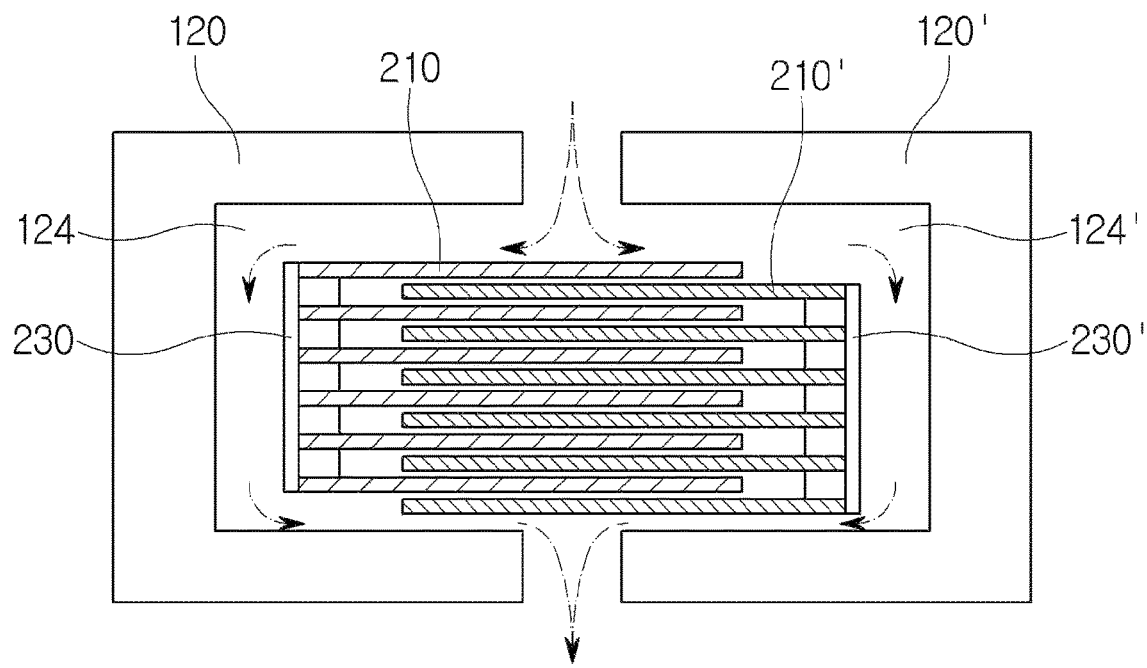
FIG. 5 is a front view that illustrates a state in which the first embodiment is installed between two adjacent gas turbine parts.

FIG. 5 is a front view that illustrates a state in which the first embodiment is installed between two adjacent gas turbine parts. The front view throughout the specification is a view of a portion of the vane segments and the seal assembly when viewed in an axial direction A (i.e., from upstream side or from downstream side). As described above, since a thickness of the spacers 220 in the radial direction R may be formed to be greater than a thickness of the seal bodies 210, as illustrated in FIG. 5, in the overlapping portion O in a state in which the first and second seal portions 210, 210' are inserted into each other, the seal bodies adjacent to each other are spaced apart in the radial direction R from each other. The arrows indicate a leakage path of the combustion gas. FIG. 5 depicts two turbine vane segments and the seal assembly, which are in an alignment state as intended at a design process. However, during the operation of the turbine, the alignment state may become misaligned as shown in FIG. 6.

Figure 6:
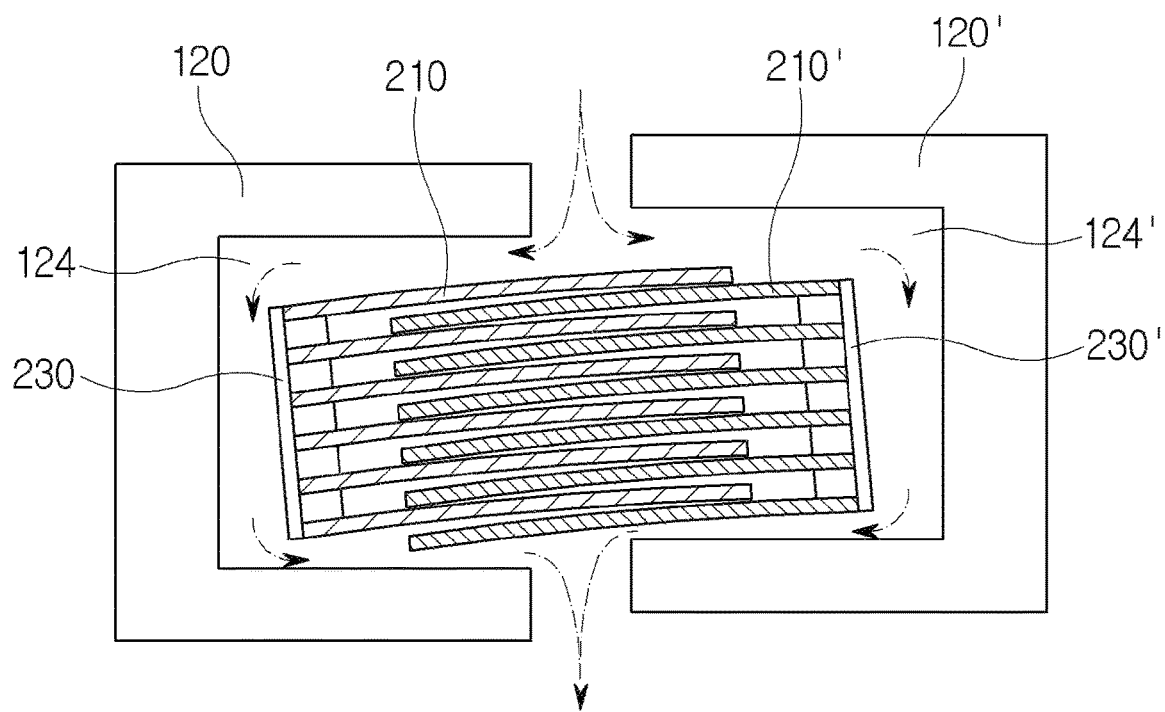
FIG. 6 is a front view that illustrates a state in which one part is moved in FIG. 5.

During the operation of the turbine, as shown in FIG. 6, as the gaps between the seal bodies 210, 210' are allowed to change, the deformation may be absorbed. That is, while a position of the second seal portion 200' relative to the first seal portion 200 is allowed to move vertically (i.e., in the radial direction R) and horizontally (i.e., in the circumferential direction C) on the basis of FIG. 6, the position of the first and second seal portion 200, 200' may follow a relative movement of the turbine vane segments more flexibly. To enhance such flexible movement, the seal bodies may be made of a more flexible material than a material of the spacer. As a result, the maintenance of the designed leakage performance may be improved.

In some cases, it is possible to configure the seal bodies 210, 210' to overlap each other at the overlapping portion O. In this case, following properties to the deformation may be slightly reduced, but the sealing performance may be improved, therefore, those skilled in the art may adjust the gap between the seal bodies, as necessary.

Figure 7:
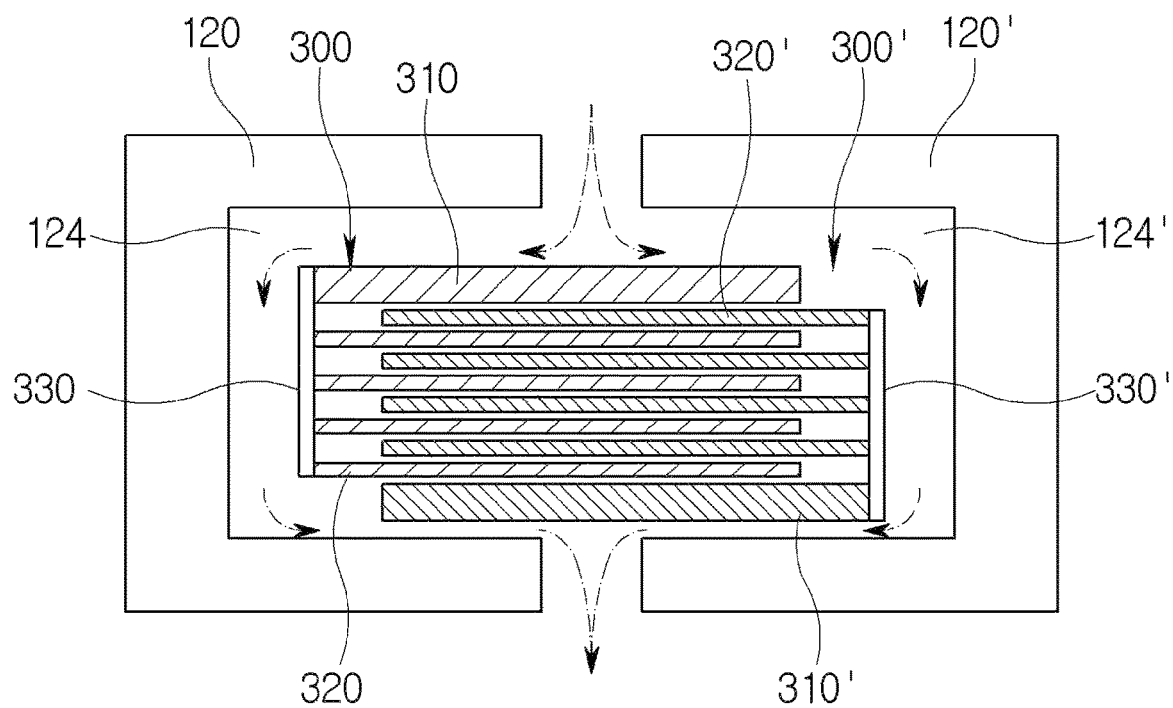
FIG. 7 is a front view that illustrates a second embodiment of the seal assembly according to the present disclosure.

FIG. 7 is a front view that illustrates a second embodiment of the seal assembly according to the present disclosure. The second embodiment is essentially the same as the first embodiment in that a first seal portion 300 and a second seal portion 300' are inserted into each other. However, there are differences in that the first seal portion 300 and the second seal portion 300' according to the second embodiment have relatively thick seal bodies 310 and 310' and thin seal bodies 320 and 320', which are bonded at bonding portions 330 and 330'.

The thick seal bodies 310 and 310' are disposed on an upper surface and a lower surface of the seal assembly, respectively, thereby the intensity of the seal assembly May be further improved. In other words, in the first seal portion 300, one seal body 310, located at the uppermost side among its seal bodies, may have a relatively larger thickness than the remaining seal bodies. Correspondingly, in the second seal portion 300', one seal body 310', located at the lower most side among its seal bodies, may have a relatively larger thickness than the remaining seal bodies. In the first and second seal portion 300, 300', the remaining seal bodies may have a same thickness.

Figure 8:
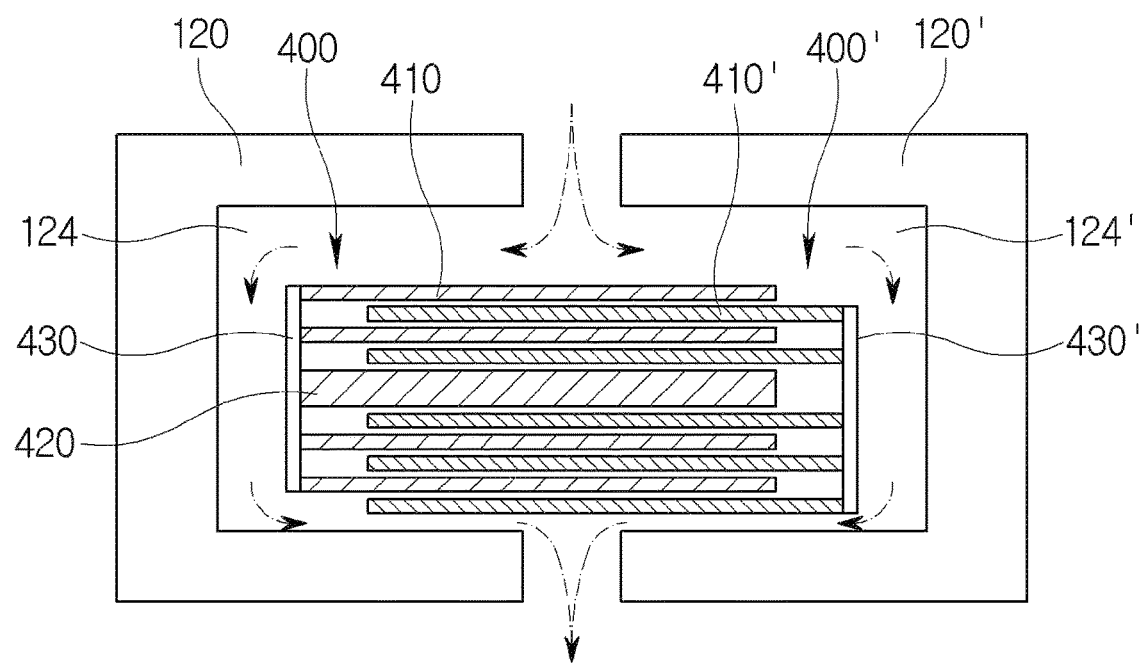
FIG. 8 is a front view that illustrates a third embodiment of the seal assembly according to the present disclosure.

FIG. 8 is a front view that illustrates a third embodiment of the seal assembly according to the present disclosure. The third embodiment is essentially the same as the first embodiment in that a first seal portion 400 and a second seal portion 400' are inserted into each other. However, the third embodiment has a difference in that the first seal portion 400 has a relatively thin seal body 410 and a relatively thick seal body 420, which are bonded at a bonding portion 430. On the contrary, a second seal portion 400' has a shape in which a seal body 410' having a thin and uniform thickness is bonded through a bonding portion 430'.

In the first seal portion 400, the thin seal bodies 410 are disposed on an upper surface and a lower surface of the seal assembly, respectively, and the thick seal portion 420 is positioned in the middle in the radial direction. A gap between the second seal bodies 410' in the second seal portion 400' is set to be nonuniform such that the thick seal body 420 can be inserted between the second seal bodies 410'.

As described above, since the thick seal body is disposed in the middle of the first seal portion, the leakage path may be effectively blocked on upper and lower parts, and the overall intensity at a middle part may be improved. In some cases, it is possible to consider an example of disposing the thick seal body in the second seal portion as well.

Figure 9:
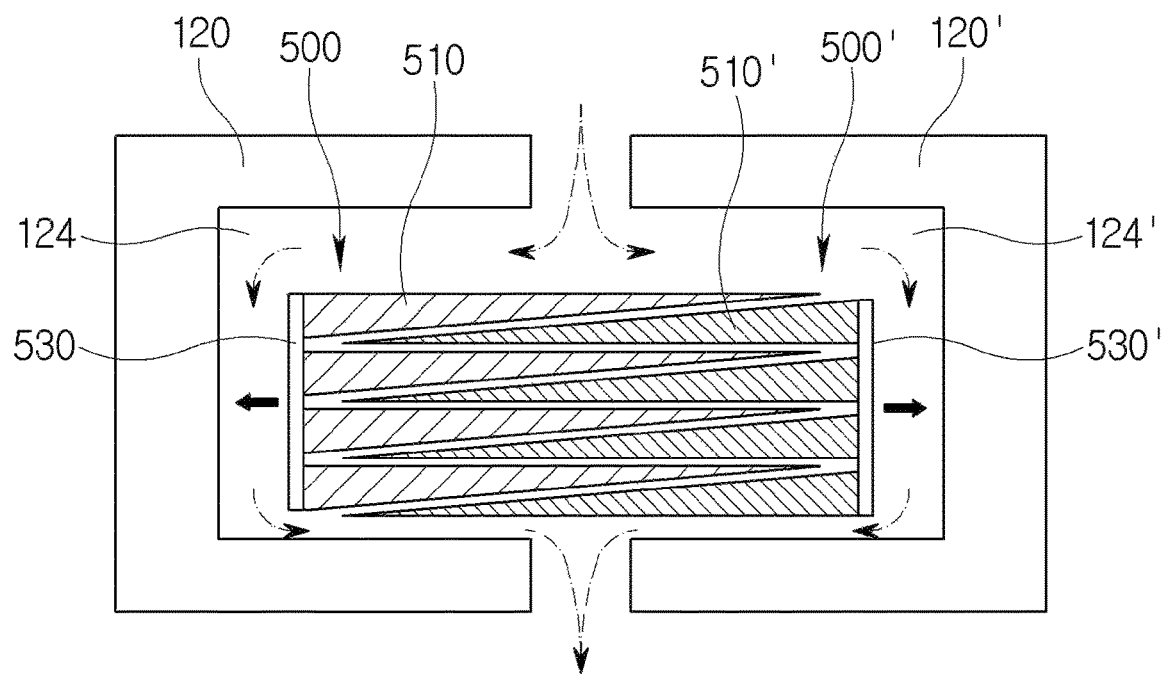
FIG. 9 is a front view that illustrates a fourth embodiment of the seal assembly according to the present disclosure.

FIG. 9 is a front view that illustrates a fourth embodiment of the seal assembly according to the present disclosure, and the fourth embodiment is essentially the same as the first embodiment in that a first seal portion 500 and a second seal portion 500' are inserted into each other. However, the fourth embodiment has a difference in that seal bodies 510 and 510' provided in first and second seal portions 500 and 500' have a shape of a taper that tapers toward an end, and the seal bodies 510, 510' are bonded at bonding portions 530 and 530'. In other words, in the first and second seal portions 500, 510', the thickness of the seal bodies 510, 510' may gradually decrease from the bonding portions 530, 530' toward the end of the seal bodies 510, 510', respectively.

When a leaked gas is introduced from an upper side in the fourth embodiment, a downward pressure is applied inwardly toward the seal assembly by the leaked gas as shown in FIG. 9. At this time, according to this embodiment, two seal portions 500, 510' may move away from each other due to the tapered surfaces. As a result, a leakage amount between side walls of the seal accommodating grooves and the bonding portions 530 and 530' may be reduced.

Meanwhile, the seal assembly described above is configured to seal a gap between two parts, but in some cases, a plurality of parts may be combined to form a T-shaped joint surface. In order to seal the T-shaped joint, a plurality of seal assemblies should be combined, and the present disclosure may be applied to the T-shaped joint sealing as well.

Figure 10:
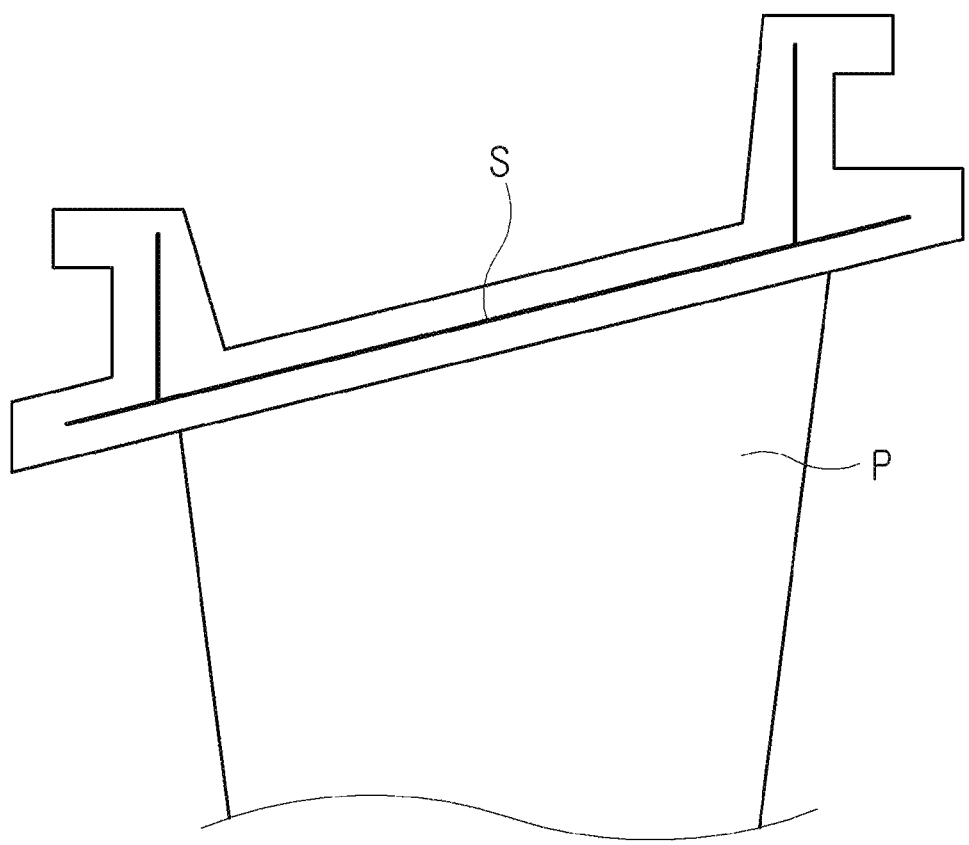
FIG. 10 is a schematic view that illustrates a T-shaped joint.

FIG. 10 is a view that illustrates an example of the T-shaped joint, and T-shaped joint is disposed on an upper surface of a part P (here, the part is a vane), and a plurality of seal assemblies S are installed inside the T-shaped joint to seal the T-shaped joint.

Figure 11:
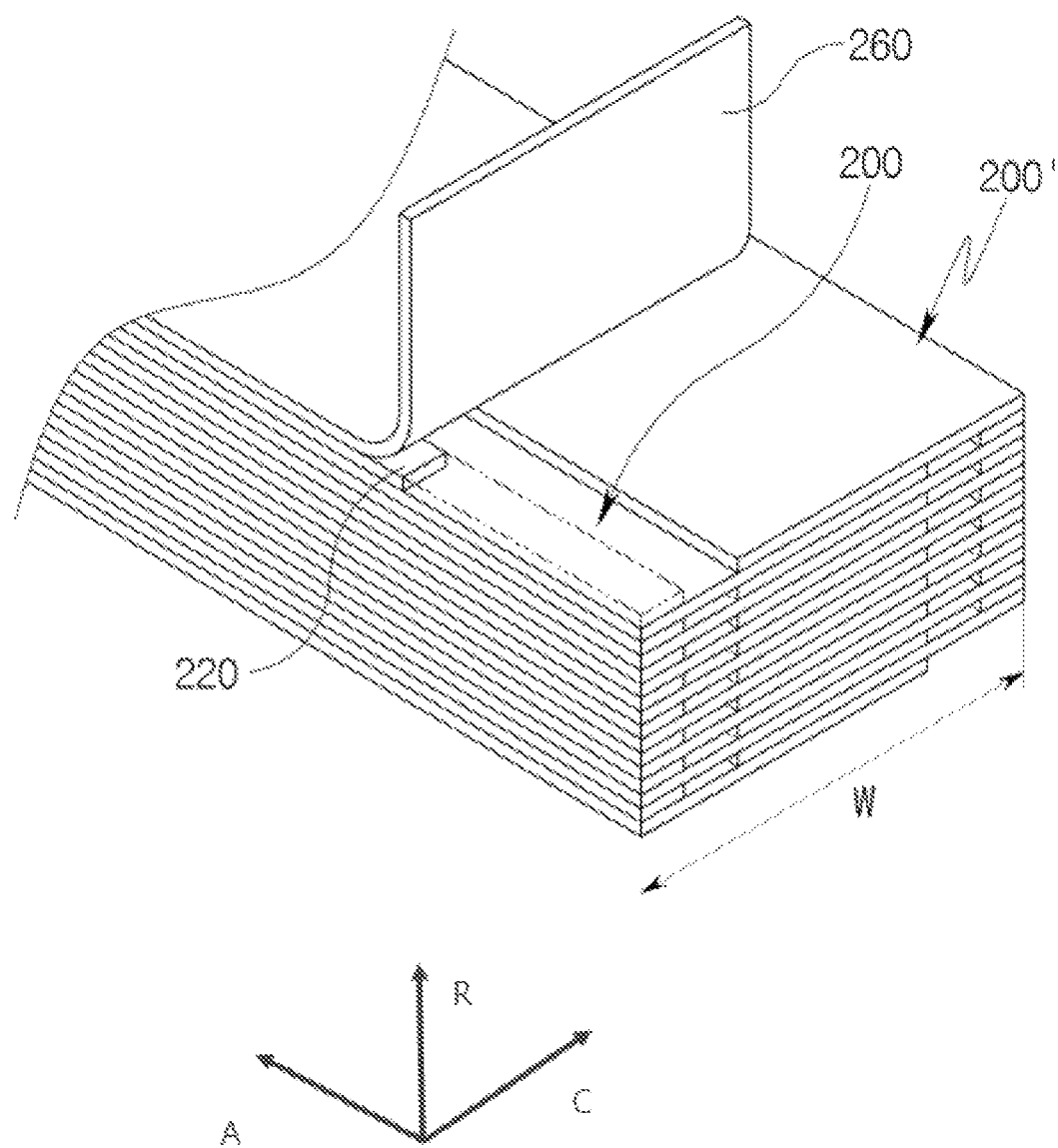
FIG. 11 is a perspective view that illustrates a fifth embodiment of the seal assembly according to the present disclosure that is applied to the T-shaped joint.

FIG. 11 is a perspective view that illustrates a fifth embodiment of the seal assembly according to the present disclosure that can be applied to the T-shaped joint. The fifth embodiment has essentially the same structure as that of first embodiment in that a first seal portion 200 and a second seal portion 200' are inserted into each other. However, the fifth embodiment further includes a supporting portion 260 which is formed by bending both ends (only one end is illustrated in FIG. 11) of the seal portion 200 disposed on an uppermost layer of the first seal portion 200 radially upward along an insertion direction of the first seal portion, or a width direction W of the seal assembly (i.e., the circumferential direction C). In this case, a portion near the end of the spacer 220 contacting the supporting portion 260 is removed, and the spacer 220 contacting the supporting portion 260 has a shorter length compared to other spacers 220.

Figure 12:
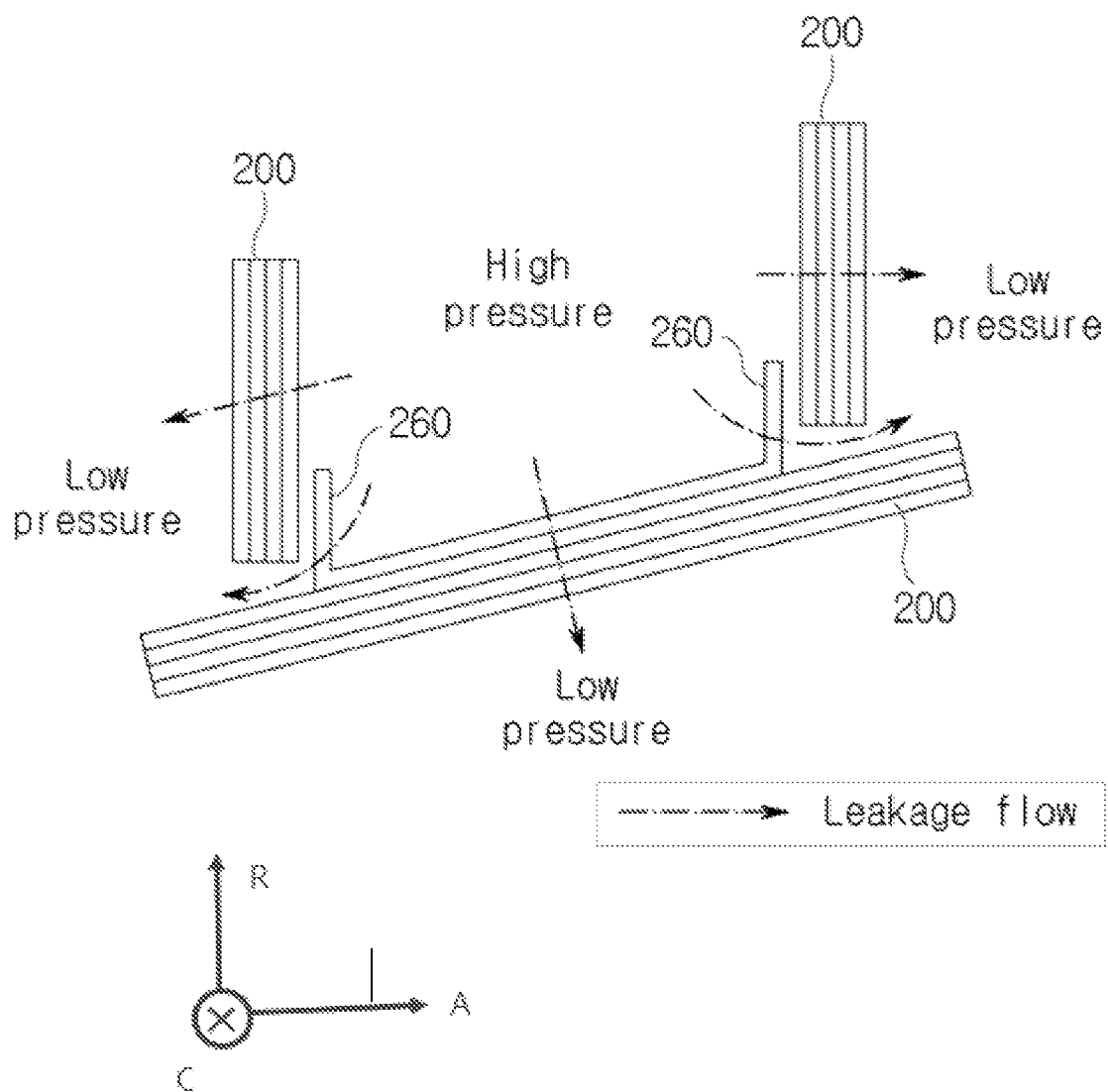
FIGS. 12 and 13 are schematic views that illustrate application examples of the fifth embodiment.

FIG. 12 illustrates a seal assembly formed by combining two first embodiments on an upper part of the fifth embodiment, and each of the two first embodiments are disposed to contact the two supporting portions 260 in the seal assembly. In this case, a space between the two first embodiments is relatively a high-pressure space, and outer sides of the space in left and right directions are relatively low-pressure spaces.

To ensure stable support, the supporting portions 260 are disposed on high-pressure space sides and the first embodiments are disposed in a low-pressure space. That is, due to a pressure gap between two spaces, a force pushing the supporting portion 260 toward the first embodiments is applied, resulting in the two members of the first embodiment to maintain a stable contact with each other. Here, not only the first embodiment can be applied, but any of the embodiments described above may be used for the T-shaped joint sealing.

Figure 13:
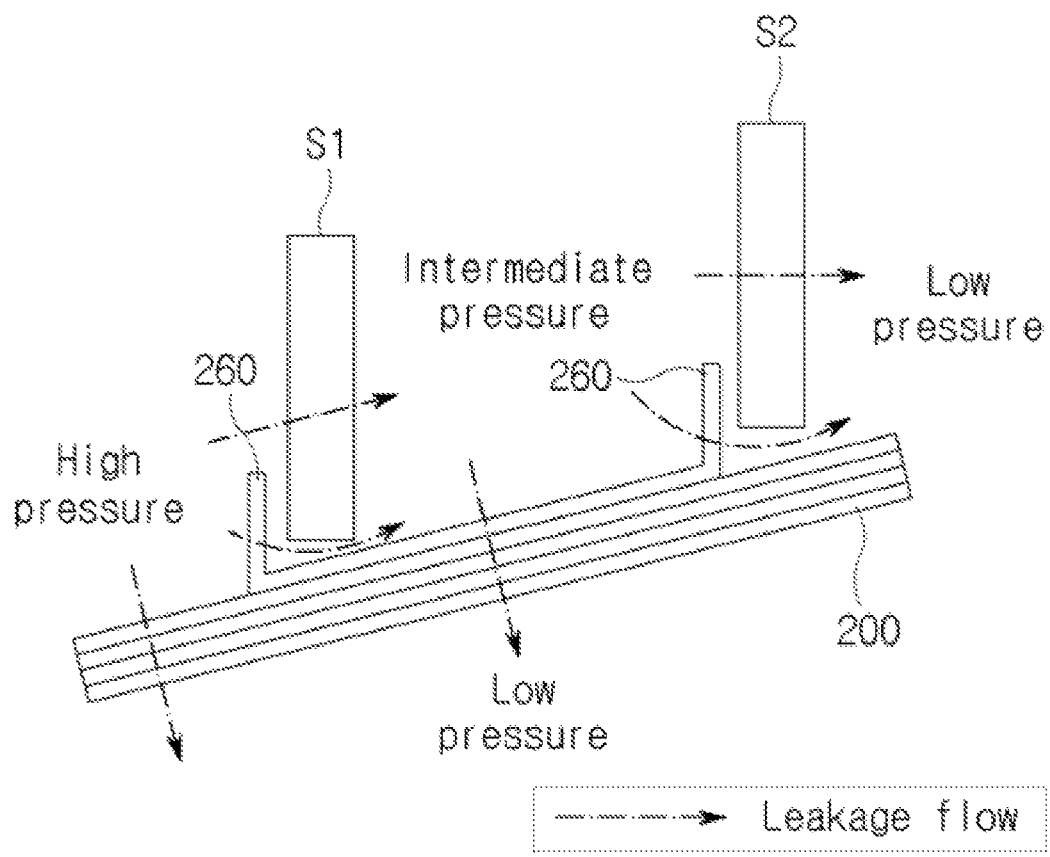

In addition, as illustrated in FIG. 13, it is possible to use a combination of the first embodiment 200 and a conventional typical single seal S1 or multi-layer seal S2. In this embodiment, the supporting portion 260 is disposed in a relatively high-pressure space, as the same as FIG. 12.

What is claimed is:

1. A seal assembly, comprising:
a first seal portion comprising a plurality of seal bodies stacked to be spaced apart from each other; and
a second seal portion comprising a plurality of seal bodies stacked to be spaced apart from each other,
wherein ends of the seal bodies of the first seal portion are inserted between the seal bodies of the second seal portion such that each of the seal bodies of the first seal portion and each of the seal bodies of the second seal portion are stacked alternately and at least partially overlap each other to form an overlapping portion,
wherein each of the first seal portion and the second seal portion has a bonding portion configured to fix the plurality of seal bodies on one end thereof,
wherein a thickness of each of the seal bodies is constant, and at least one among the seal bodies of the first seal portion has a different constant thickness from a constant thickness of another of the seal bodies of the first seal portion,
wherein a space between adjacent seal bodies of the second seal portion is larger than a thickness of each of the seal bodies of the first seal portion, such that, in the overlapping portion, each of overlapped portions of the seal bodies is spaced apart from each other,
wherein a top seal body disposed at an uppermost end in the first seal portion and a bottom seal body disposed at a lowermost end in the second seal portion have a greatest thickness.

2. The seal assembly of claim 1,
wherein the overlapping portion is disposed between the bonding portion of the first seal portion and the bonding portion of the second seal portion.

3. The seal assembly of claim 2,
wherein each of the first seal portion and the second seal portion has a spacer provided between the seal bodies to form a spacing between the seal bodies.

4. The seal assembly of claim 3,
wherein the spacer forms a part of the bonding portion.

5. The seal assembly of claim 3,
wherein the seal bodies are made of a flexible material compared with a material of the spacer.

6. The seal assembly of claim 2,
wherein the bonding portion is formed by welding ends of the plurality of seal bodies on one side of the first seal portion and the second seal portion.

7. The seal assembly of claim 1,
wherein, when a first part and a second part adjoin each other in a turbine, at least a part of the first seal portion is inserted into the first part, and at least a part of the second seal portion is inserted into the second part, and at least a part of the overlapping portion is disposed to cover a gap between the first part and the second part.

8. A turbine, comprising:
at least two parts disposed adjacent to each other;
seal accommodating grooves formed, respectively, on surfaces of the at least two parts opposing each other; and
a seal assembly according to claim 1,
wherein the first seal portion of the seal assembly and the second seal portion of the seal assembly are inserted into the seal accommodating grooves, respectively.

9. The turbine of claim 8,
wherein each of the at least the two parts is a turbine vane segment comprising two platforms, being spaced apart from each other in a radial direction of the turbine, and a turbine vane extending between the platforms, and each of the seal accommodating grooves is formed on a surface of the platforms opposing each other.

10. The turbine of claim 8,
wherein the overlapping portion is disposed between the bonding portion of the first seal portion and the bonding portion of the second seal portion.

11. The turbine of claim 8,
wherein at least a part of the overlapping portion is disposed to cover a gap between the at least two parts.

12. A seal assembly, comprising:
a first seal portion comprising a plurality of seal bodies stacked to be spaced apart from each other; and
a second seal portion comprising a plurality of seal bodies stacked to be spaced apart from each other,
wherein ends of the seal bodies of the first seal portion are inserted between the seal bodies of the second seal portion such that each of the seal bodies of the first seal portion and each of the seal bodies of the second seal portion are stacked alternately and at least partially overlap each other to form an overlapping portion,
wherein each of the first seal portion and the second seal portion has a bonding portion configured to fix the plurality of seal bodies on one end thereof,
wherein a thickness of each of the seal bodies is constant, and at least one among the seal bodies of the first seal portion has a different constant thickness from a constant thickness of another of the seal bodies of the first seal portion,
wherein a space between adjacent seal bodies of the second seal portion is larger than a thickness of each of the seal bodies of the first seal portion, such that, in the overlapping portion, each of overlapped portions of the seal bodies is spaced apart from each other,
wherein one seal body having a greatest thickness is disposed between a top seal body and a bottom seal body in the first seal portion.

13. The seal assembly of claim 12,
wherein the overlapping portion is disposed between the bonding portion of the first seal portion and the bonding portion of the second seal portion.

14. The seal assembly of claim 13,
wherein each of the first seal portion and the second seal portion has a spacer provided between the seal bodies to form a spacing between the seal bodies.

15. The seal assembly of claim 14,
wherein the spacer forms a part of the bonding portion.

16. The seal assembly of claim 13,
wherein the bonding portion is formed by welding ends of the plurality of seal bodies on one side of the first seal portion and the second seal portion.

17. The seal assembly of claim 12,
wherein, when a first part and a second part adjoin each other in a turbine, at least a part of the first seal portion is inserted into the first part, and at least a part of the second seal portion is inserted into the second part, and at least a part of the overlapping portion is disposed to cover a gap between the first part and the second part.

18. A seal assembly, comprising:
a first seal portion comprising a plurality of seal bodies stacked to be spaced apart from each other; and
a second seal portion comprising a plurality of seal bodies stacked to be spaced apart from each other,
wherein ends of the seal bodies of the first seal portion are inserted between the seal bodies of the second seal portion along a first direction and each of the seal bodies is stacked alternately and at least partially overlap each other to form an overlapping portion, and
wherein both ends of the seal body disposed at an uppermost side of the first seal portion have supporting portions bent outward along the first direction, such that a length of the seal body disposed at the uppermost side of the first seal portion measured in a second direction perpendicular to the first direction is smaller than a length of remaining seal bodies of the first seal portion measured in the second direction,
wherein additional seals are disposed at each of the supporting portions.

19. The turbine of claim 18,
wherein different pressures are applied to both sides of the additional seals, and the supporting portions are disposed in a region having a relatively higher pressure than the additional seals.

20. The turbine of claim 19,
wherein each of the first seal portion and the second seal portion has a spacer provided between the seal bodies to form a spacing between the seal bodies,
wherein a spacer disposed adjacent to the seal body disposed at an uppermost side of the first seal portion has a shorter length than other spacers.

* * * * *